UNITED STATES PATENT OFFICE 2,002,174

COLORED RUBBER PRODUCT AND PROCESS OF PREPARING IT

Heinz Eichwede, Frankfort-on-the-Main-Hochst, Germany, assignor to General Aniline Works, Inc., New York, N. Y., a corporation of Delaware No Drawing. Application December 21, 1933, Serial No. 703,488. In Germany December 23, 1932

6 Claims. (Cl. 18—50)

The present invention relates to colored rubber products and to a process of preparing them.

I have found that rubber products (which term is meant to include natural rubber as well as the synthetic products which have a constitution and properties similar to those of natural rubber, as for example polymerization products of butadiene hydrocarbons such as butadiene or isoprene) can be colored in clear yellowish-red to violet shades having very good fastness properties by incorporating with the rubber products or mixtures containing them, prior to vulcanization, water-insoluble disazo-dyestuffs of the general formula:

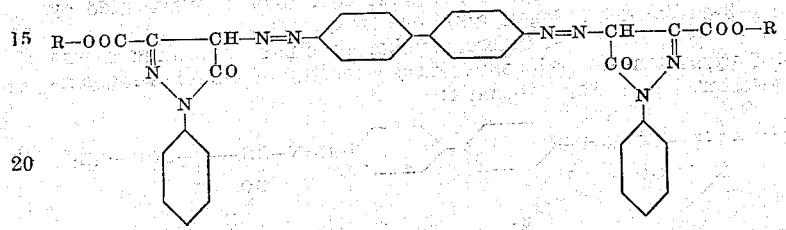

wherein the diphenyl radical and the phenyl radical of the pyrazolone may be substituted by halogen, alkyl or alkoxy groups and R stands for methyl or ethyl.

The manufacture of these disazo-dyestuffs is disclosed in my co-pending application Serial No. 703,489, filed December 21, 1933, for Water-insoluble disazo-dyestuffs.

By reason of the said dyestuffs being practically insoluble in rubber, they do not bleed when the rubber products are worked up; neither do they give rise to that phenomenon which is known as blushing or efflorescence when the rubber articles are stored. Furthermore, they are insoluble in benzine which renders them especially suitable also for being used in connection with cold vulcanization processes which are advantageously carried out in the presence of benzine.

The following examples will further illustrate the nature of this invention, but the invention is not restricted to these examples. The parts are by weight:

(1) A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 1 to 2 parts of the disazo-dyestuff obtainable by coupling 1 mol of tetrazotized 3.3'-dichloro-4.4'-diamino-diphenyl with 2 mols of 1-phenyl-5-pyrazolone-3-carboxylic acid-ethyl-ester. The mixture is vulcanized in a vulcanization press for 12 minutes at a steam pressure of 3 atmospheres above atmospheric pressure. There is obtained a clear red vulcanizate of very good fastness properties.

(2) A rubber mixture is prepared in the usual manner from crepe rubber, the usual admixtures and 1 to 2 parts of the disazo-dyestuff described in Example 1. The mixture is vulcanized by immersing it for 8 seconds in a solution of 3 parts of sulfur chloride in 97 parts of benzine. The shades and fastness properties of the cold vulcanizate, thus obtained, are similar to those of the vulcanizate obtainable according to Example 1.

(3) A mixture is prepared from 100 parts of crepe rubber, 2.5 parts of sulfur, 0.35 part of thiuram, 5 parts of zinc white, 0.6 part of ozocerite, 0.5 part of stearic acid and 2 parts of the disazo-dyestuff obtainable by coupling tetratized 4.4'-diamino-diphenyl with 1-phenyl-5-pyrazolone-3-carboxylic acid-ethyl-ester. The mass is vulcanized in an iron mould in a vulcanization press for 15 minutes at a superatmospheric pressure of 2 atmospheres. A red vulcanizate is thus obtained.

(4) A mixture is prepared from 100 parts of crepe rubber, 2.8 parts of sulfur, 0.4 part of paraffin oil, 3 parts of stearic acid, 2 parts of brown coal tar oil, 2 parts of colophony, 60 parts of calcium carbonate, 13.5 parts of zinc white, 4 parts of magnesium oxide, 6 parts of caolin, 0.4 part of thiuram and 2 parts of the disazo-dyestuff obtainable by coupling tetrazotized 3.3'-dimethoxy-4.4'-diamino-diphenyl with 1-phenyl-5-pyrazolone-3-carboxylic acid-ethyl-ester. The mixture is vulcanized for 45 minutes in hot air at 120° C. and in this way a violet-red vulcanizate is obtained.

Be replacing in the foregoing examples the dyestuffs mentioned therein by others which are comprised by the general formula and have been prepared from tetrazo-compounds such as 3.3'-dimethyl-4.4'-diaminodiphenyl,
3.3'-dibromo-4.4'-diaminodiphenyl, 2.2'-dichloro-3.3'-dimethyl-4.4'-diaminophenyl,
2.2'-dichloro-5.5'-dimethoxy-4.4'-diaminodiphenyl,
3.3'-dichloro-2.2'-dimethoxy-4.4'-diaminodiphenyl
or
6.6'-dichloro-3.3'-diethoxy-4.4'-diaminodiphenyl
and coupling components, such as
1-(2'-chlorophenyl)-5-pyrazolone-3-carboxylic acid-methyl- or ethyl-ester, 1-(2'5'-dichlorophenyl)-5-pyrazolone-3-carboxylic acid-methyl- or ethyl-ester,
1-(4'-methylphenyl)-5-pyrazolone-3-carboxylic acid-methyl- or ethyl-ester,
1-(2'-chloro-6'-methylphenyl)-5-pyrazolone-3-carboxylic acid-methyl- or ethyl-ester,
1-(4'-bromophenyl)-5-pyrazolone-3-carboxylic acid-ethyl-ester,
there are obtained rubber dyeings of shades and fastness properties similar to those disclosed in the foregoing examples.

I claim:

1. The process of producing colored rubber products which comprises mixing a rubber product with a water-insoluble disazo-dyestuff corresponding to the following general formula:

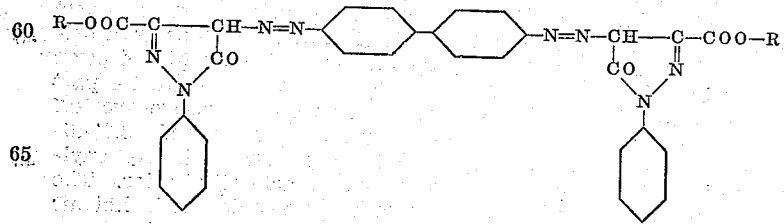

wherein the diphenyl radical and the phenyl radical of the pyrazolone may be substituted by halogen, alkyl or alkoxy groups and R stands for methyl or ethyl, and then vulcanizing the mixture.

2. Colored rubber products containing a water-insoluble disazo-dyestuff of the following general formula:

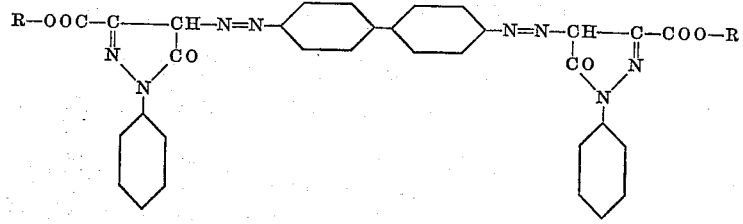

wherein the diphenyl radical and the phenyl radical of the pyrazolone may be substituted by halogen, alkyl or alkoxy groups and R stands for methyl or ethyl.

3. Colored rubber products containing a water-insoluble disazo-dyestuff of the following general formula:

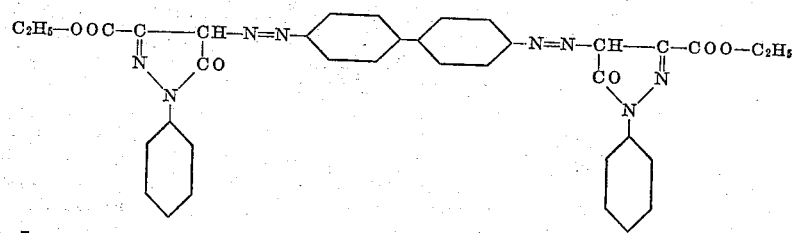

wherein the diphenyl radical and the phenyl radical of the pyrazolone may be substituted by halogen, alkyl or alkoxy groups.

4. Colored rubber products containing a water-insoluble disazo-dyestuff of the following general formula:

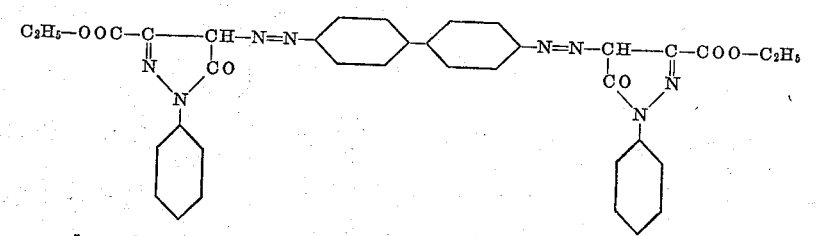

wherein the diphenyl radical and the phenyl radical of the pyrazolone may be substituted by chlorine, methyl or methoxy groups.

5. Colored rubber products containing a water-insoluble disazo-dyestuff derived from 4.4'-diamino-diphenyl and 1-phenyl-5-pyrazolone-3-carboxylic acid-ethyl-ester.

6. Colored rubber products containing a water-insoluble disazo-dyestuff derived from 3.3'-dichloro-4.4'-diamino-diphenyl and 1-phenyl-5-pyrazolone-3-carboxylic acid-ethyl-ester.

HEINZ EICHWEDE.